United States Patent
Patel et al.

(10) Patent No.: US 9,519,773 B2
(45) Date of Patent: Dec. 13, 2016

(54) RETURNING TO A CONTROL TRANSFER INSTRUCTION

(71) Applicant: Intel Corporation, Santa Clara, CA (US)

(72) Inventors: Baiju Patel, Portland, OR (US); Vedvyas Shanbhogue, Austin, TX (US); Ravi Sahita, Portland, OR (US)

(73) Assignee: Intel Corporation, Santa Clara ( * ) Notice: Subject to any disclaimer, the term of this patent is extended or adjusted under 35 U.S.C. 154(b) by 0 days.

(21) Appl. No.: 14/484,751

(22) Filed: Sep. 12, 2014

(65) Prior Publication Data

US 2016/0078222 A1 Mar. 17, 2016

(51) Int. Cl.
*H04K 1/00* (2006.01)
*G06F 21/52* (2013.01)
*G06F 21/74* (2013.01)
*G06F 9/30* (2006.01)

(52) U.S. Cl.
CPC .......... *G06F 21/52* (2013.01); *G06F 9/30003* (2013.01); *G06F 21/74* (2013.01); *G06F 2221/033* (2013.01)

(58) Field of Classification Search
CPC ...... G06F 21/52; G06F 21/74; G06F 9/30003; G06F 2221/033
USPC .......................................................... 726/22
See application file for complete search history.

(56) References Cited

U.S. PATENT DOCUMENTS

| | | | |
|---|---|---|---|
| 4,866,599 A | 9/1989 | Morganti et al. | |
| 7,552,477 B1* | 6/2009 | Satish | G06F 9/545 |
| | | | 710/260 |
| 8,261,065 B2 | 9/2012 | Savagaonkar et al. | |
| 2004/0143727 A1 | 7/2004 | McDonald | |
| 2010/0228952 A1* | 9/2010 | Bean | G06F 9/30054 |
| | | | 712/205 |
| 2012/0297167 A1 | 11/2012 | Shah et al. | |
| 2013/0117843 A1 | 5/2013 | Komaromy et al. | |
| 2014/0337604 A1* | 11/2014 | Strong | G06F 9/30145 |
| | | | 712/205 |

FOREIGN PATENT DOCUMENTS

| | | |
|---|---|---|
| JP | 07-319687 A | 12/1995 |
| JP | 2010-198183 A | 9/2010 |
| WO | 2016040071 | 3/2016 |

OTHER PUBLICATIONS

International Search Report and Written Opinion received for International Application No. PCT/US2015/048124, mailed on Dec. 7, 2015, 11 pages.

(Continued)

*Primary Examiner* — Mohammad W Reza
(74) *Attorney, Agent, or Firm* — Thomas R. Lane

(57) ABSTRACT

In an embodiment, the present invention includes a processor having a decode unit and an execution unit. The decode unit is to decode control transfer instructions and the execution unit is to execute control transfer instructions, the control transfer instructions including a call instruction and a return instruction. The processor is to operate in a first mode in which the processor is to raise a fault if a next instruction to be executed immediately after the return instruction is not the call instruction.

14 Claims, 7 Drawing Sheets

(56) References Cited

OTHER PUBLICATIONS

Patrick Billgren, "Analysis of Defenses against Return Oriented Programming", Department of Electrical and Information Technology Lund University, Jun. 25, 2014, 108 Pages.

Office Action Received for Taiwanese Patent Application No. 104125605, mailed on Aug. 2, 2016, 7 Pages of Taiwanese Office Action and 9 Pages of English Translation.

* cited by examiner

Method 300

RETURNING TO A CONTROL TRANSFER INSTRUCTION

BACKGROUND

Return-oriented programming (ROP) is a computer security exploit technique in which an attacker uses software control of a call stack to execute an attacker-chosen sequence of machine instructions. These clusters of instructions typically end with a programmer-intended or unintended return (RET) instruction within existing program code. The intended or unintended RET instruction transfers execution to the attacker-chosen return address on the stack and allows the attacker to retain execution control through the program code, and direct execution to the next set of chosen sequence of instructions to achieve the attacker's intent. The clusters of attacker-chosen instruction sequences are referred to as gadgets. Some gadgets may be found by attackers in functions compiled into a program or libraries, others are just arbitrary byte sequences that decode into a gadget.

Often the executed gadget includes only a few assembler instructions followed by a RET instruction that can perform a well-defined operation. By chaining together a set of these gadgets such that the RET instruction from one gadget lands into the next gadget and so on, the malware writer is able to execute a longer sequence of attacker desired instructions without injecting any code into the program.

The ROP technique uses vulnerabilities like stack buffer overflows to deliver a payload including a chained list of pointers to gadgets, then overwrites the return address of the function that was used to perform the stack buffer overflow to point to the first gadget in the sequence. When this function executes a RET instruction, control transfers to the first gadget instead of the function caller. This gadget may then consume one or more data elements from the payload on the stack. Using this exploitation technique, a malware writer may change the control flow of the program and cause a control transfer to a non-programmer intended location in the program (e.g., to the middle of an instruction).

DETAILED DESCRIPTION

Figure 1:
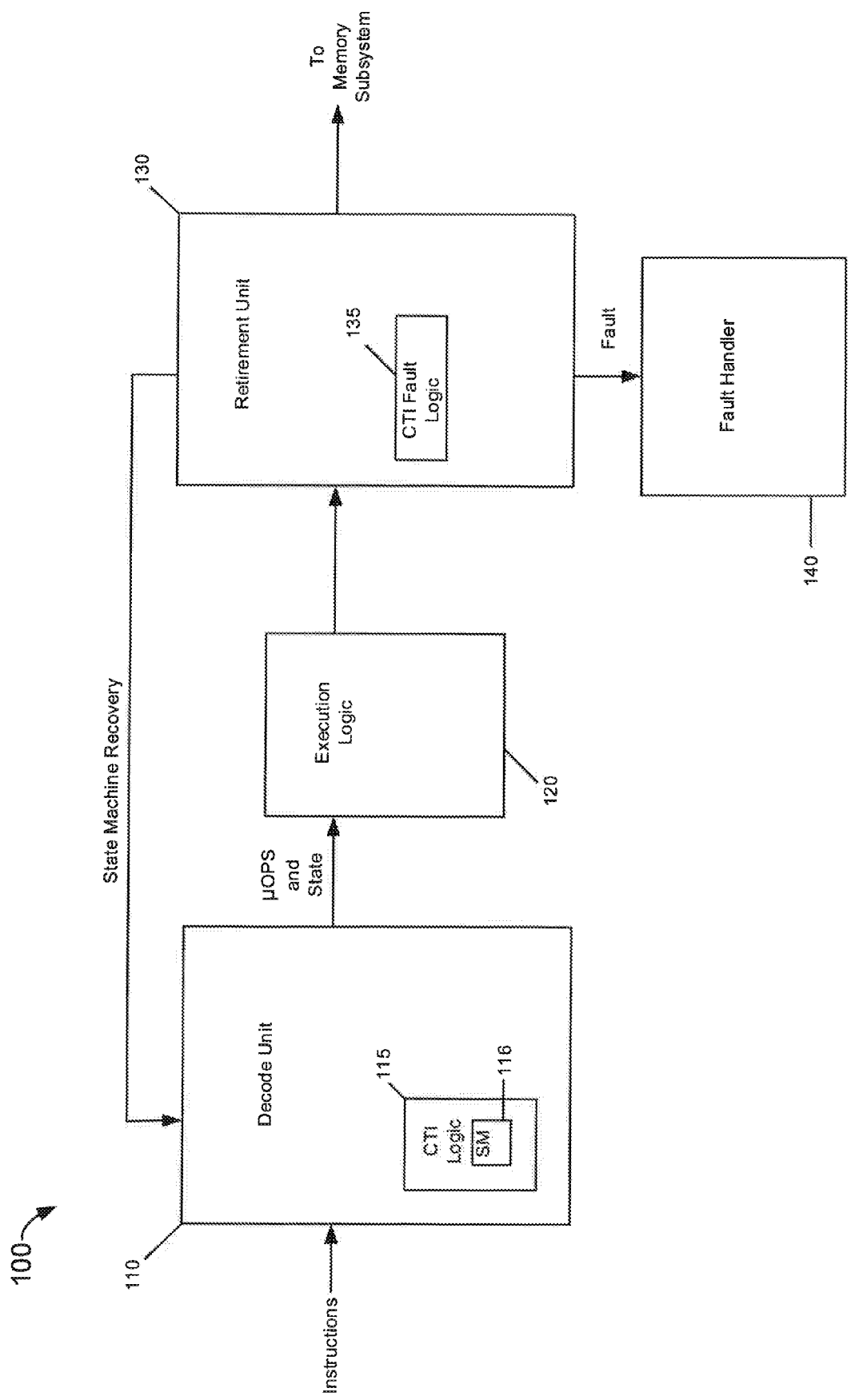
FIG. 1 is a block diagram of a portion of a processor in accordance with an embodiment of the present invention.

Embodiment of the present invention provide for a processor to be enabled to determine whether a return (RET) instruction is returning to a call (CALL) instruction, and, if not, to take action to prevent instructions beyond the return instruction from being committed to the architectural state of the processor. In this way, at least certain unintended control transfers within a program can be eliminated, constraining the number of gadgets that a malware writer can use. More specifically, embodiments may provide for a processor mode in which return instructions may arm a state machine such that hardware may enforce that return instructions return only to call (CALL) instructions. This control flow enforcement may reduce vulnerability to malicious gadgets in programs.

Embodiments of the present invention may be desired to protect against ROP attacks without requiring the protected code to be recompiled. Embodiments of the present invention may be particularly applicable to mobile and other portable low power systems, in that software-only techniques to mitigate against ROP (like rewriting binaries to remove all instances of RET by use of functionally equivalent but larger more complex sequences), generally lead to much larger binaries and increase the execution time of the program and thereby are not suited for mobile applications where power efficiency is a prime concern. Embodiments of the present invention may also be desired to avoid the use of CALL/RET counters, statistics, and/or heuristics that may lead to false positives.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In an embodiment, an instruction set architecture (ISA) may be implemented by one or more micro-architectures, which include processor logic and circuits used to implement one or more instruction sets. Accordingly, processors with different micro-architectures can share at least a portion of a common instruction set. For example, Intel® Pentium 4 processors, Intel® Core™, and Intel® Atom™ processors from Intel Corp. of Santa Clara, Calif., and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a register alias table (RAT), a reorder buffer (ROB) and a retirement register file). In one embodiment, registers may include one or more registers, register architectures, register files, or other register sets that may or may not be addressable by a software programmer.

An instruction may include one or more instruction formats. Such instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

In an embodiment, an ISA may include a first control transfer instruction, referred to herein as a CALL instruction, used to transfer control from a first program, procedure, function, routine, module, or other group of code or instructions (to be referred to generally as a program) to a second program, by causing the processor executing the CALL to execute an instruction other than the next instruction sequentially (e.g., in address order) following the CALL in the first program. Typically, execution control of the processor is to return to the calling program after the processor executes that portion of the second program to which the call is made. To provide for execution control to return to the calling program, execution of the CALL may include pushing, writing, or otherwise storing, on a call stack or other data structure accessible by the processor, the address of a next instruction. Then, a second control transfer instruction, referred to herein as a RET instruction, may be used by the second program to transfer control to that address in the first program after the desired portion of the second program has been executed.

In an embodiment of the present invention, a processor mode (referred to herein as RET_TO_CALL mode) may be provided in which the behavior of a CALL instruction and the behavior of a RET instruction are modified.

When not in RET_TO_CALL mode, execution of a CALL instruction by the processor includes pushing the address of the next instruction sequentially following the CALL onto the stack. When in RET_TO_CALL mode, execution of a CALL instruction by the processor includes pushing the address of the CALL instruction onto the stack.

When in RET_TO_CALL mode, execution of a RET instruction by the processor includes the processor checking that the location to which the RET instruction returns control is a valid callsite (e.g., contains a CALL opcode). If so, execution control is transferred to the valid callsite, the CALL is executed as a no-operation (NOP) instruction, and then execution control is transferred to the next instruction sequentially (in address order) following the CALL. If the location is not a valid callsite, the processor generates a control flow violation, thus blocking the execution of gadgets that attempt to return control to an instruction not immediately following a valid callsite.

In an embodiment, in connection with the processor executing a RET instruction and returning control to a valid callsite, a software-based policy check may be used to match the RET instruction to the callsite, e.g., check that the callsite is the specific callsite from which execution control was transferred to the sequence of instructions leading to that specific RET instruction.

Referring now to FIG. 1, shown is a block diagram of a portion of a processor in accordance with an embodiment of the present invention. As shown in FIG. 1, portion 100 of the processor includes various portions of a pipelined processor such as an in-order or out-of-order processor. As seen, incoming instructions which may be macro-instructions of a given ISA are provided to a decode unit 110 that is configured to decode the instructions, e.g., into one or more smaller instruction such as micro-operations (μops).

As seen, decode unit 110 includes a CTI logic 115 in accordance with an embodiment of the present invention. In general, CTI logic 115 may analyze each incoming instruction and determine whether the instruction is associated with a control transfer. If so, CTI logic 115 may associate certain state information with one or more μops. This state indicates a state of a state machine 116 that is modified by decoding of at least certain control transfer instructions. If instead the instruction is not associated with a control transfer, a different state may be associated with the one or more μops.

More specifically and as further described below with reference to FIG. 2, when an incoming instruction is a second control transfer instruction (e.g., a RET), a transition of state machine 116 within CTI logic 115 may occur to pass from an idle state to a given wait state. Furthermore, to reflect this wait state, a given encoding may be associated with the one or more μops decoded from the second control transfer instruction. If a next incoming instruction is a first control transfer instruction (e.g., a CALL) that immediately follows the second control transfer instruction, then state machine 116 may return to the idle state and associate a given encoding with the decoded one or more μops. As will be discussed, if a second control transfer instruction (e.g., a RET) is not immediately followed by a first control transfer instruction (e.g., a CALL), CTI logic 115 may insert a fault or exception into the processor pipeline (and the state machine may remain in a wait state). This fault or exception may be a previously defined fault or exception (e.g., #GP) or a newly defined fault or exception, and in any case, may be referred to in this specification as a fault.

Otherwise, if state machine 116 is in an idle state and an incoming instruction does not relate to a control transfer, an encoding of idle state information may be associated with the one or more μops to indicate that state machine 116 remains in the idle state.

Thus as seen in FIG. 1, decode unit 110 outputs a stream of μops and associated state information to indicate a state of state machine 116 within CTI logic 115. These μops and state information may be provided to an execution logic 120, which can include various types of units including arithmetic logic units (ALUs), floating point units, and so forth that execute operations indicated by the stream of μops. In an embodiment, the first control transfer instruction (e.g., a CALL), when immediately following the second control transfer instruction (e.g., a RET) only controls the state transitions in state machine 200, and in an execution logic of the processor this first control transfer instruction (e.g., a CALL) executes as a NOP and does not cause any change in the program semantics.

In turn, results of the μops are provided to a retirement unit 130 configured to determine whether given operations were successfully performed and to retire them if so, and otherwise to raise a fault or exception if an undesired condition occurs as a result of the execution. In an out-of-order processor, retirement unit 130 may further operate to reorder instructions which may be executed in any order, back into program order. When instructions properly retire, they may be provided to further portions of a processor such as a memory subsystem.

As further seen in FIG. 1, retirement unit 130 includes a CTI fault logic 135 which may be configured to determine whether appropriate behavior occurs with regard to control transfer instructions. More specifically, CTI fault logic 135 may operate to raise a fault when a given second control transfer instruction (e.g., a RET) to be retired is not directly followed by an appropriate first control transfer instruction (e.g., a CALL), as described herein. In an embodiment, this determination may be based at least in part on an inserted fault and the state information communicated with the μops exiting from decode unit 110. If a CTI fault is detected, the fault is communicated to a fault handler 140, which may take various actions in accordance with a given handler to resolve the faulting behavior. Thus, in an embodiment, when a next instruction presented to retire after a control transfer instruction is not an appropriate control transfer instruction, retirement unit 140 may deliver a fault responsive to this CTI fault by delivering a fault-class exception (e.g., a general protection fault) such that that instruction does not retire.

Still referring to FIG. 1, in the case where a misprediction occurs and instructions are to be re-executed according to a correct branch, retirement unit 130 may communicate via a feedback path with decode unit 110 to thus provide an indication of a proper branch or other code flow to be taken. Still further, via this feedback path a state machine recovery signal can be communicated such that state machine 116 of CTI logic 115 can be placed into an appropriate state to reflect this change in program flow. Stated another way, when a fault is present in a mispredicted path, a fault is not raised due to this misprediction and accordingly the state machine recovery signal may cause state machine 116 to pass from a wait state back to an idle state or a wait state, and to also indicate the last successful instruction to retire, so that decode unit 110 can decode instructions of the correct branch. Although shown at this high level in the embodiment of FIG. 1, understand the scope of the present invention is not limited in this regard.

Figure 2:
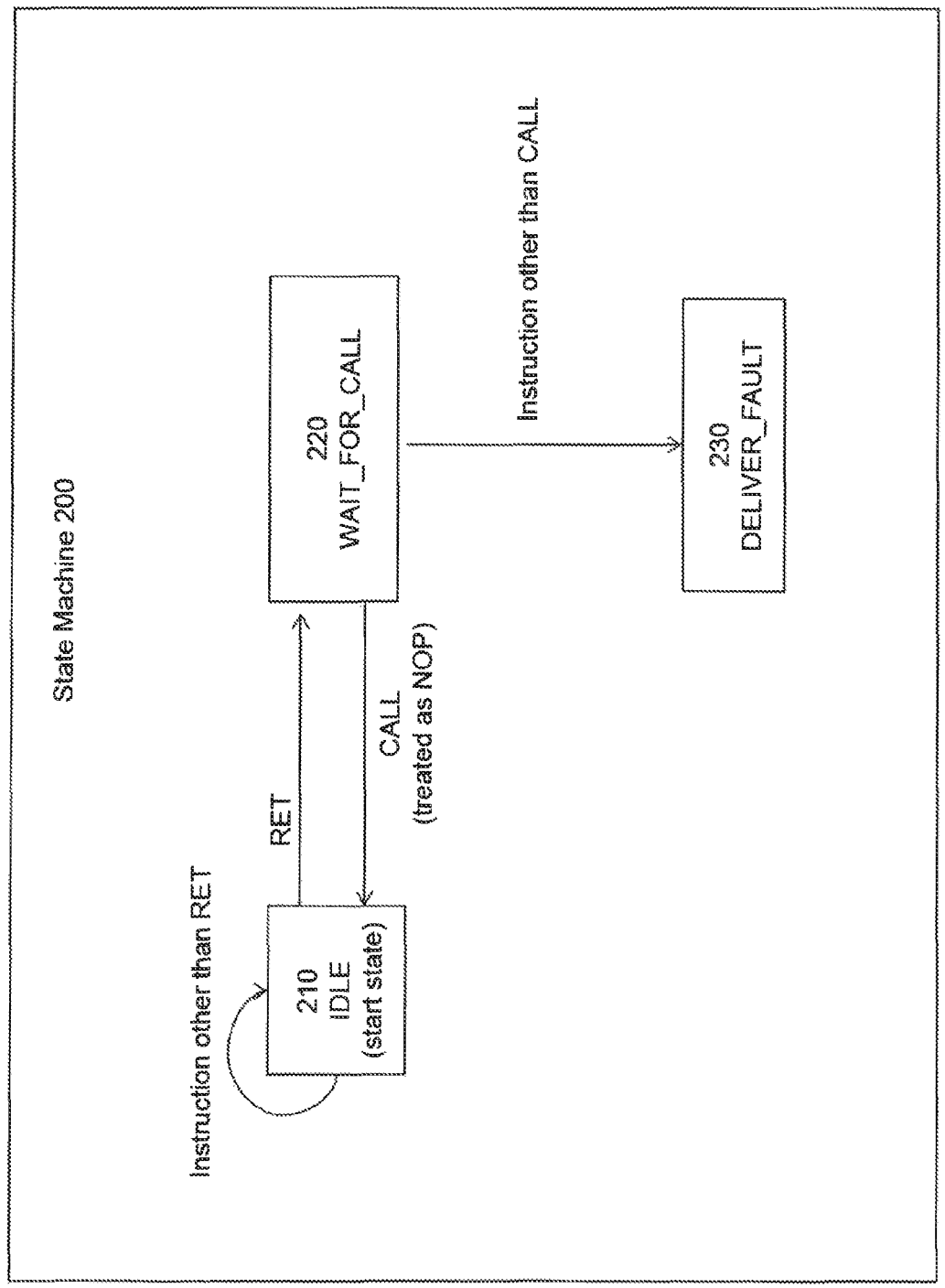
FIG. 2 is a block diagram of a state machine in accordance with an embodiment of the present invention.

Referring now to FIG. 2, shown is a block diagram of a state machine in accordance with an embodiment of the present invention. As shown in FIG. 2, state machine 200 may correspond to CTI state machine 116 of FIG. 1. State machine 200 begins operation in an IDLE state 210 into which the state machine is placed after reset of a processor.

When a RET instruction is decoded, the state machine enters the WAIT_FOR_CALL state 220. If the next instruction that is decoded is not a CALL instruction, then state machine 200 performs a DELIVER_FAULT operation 230 which causes generation of a fault (and state machine 200 may remain in the WAIT_FOR_CALL state 220). If instead the next instruction to be decoded following a control transfer instruction is a CALL instruction, state machine 200 transitions back to the IDLE state 210, and the CALL instruction is executed as a NOP instruction. State machine 200 thus enforces the following two part rule: first, the instruction at the target of a RET instruction must be a CALL instruction; and second, if the instruction is indeed a CALL, treat the CALL as a NOP. If the first part of this rule is violated, then the violating instruction (the instruction at the target of a RET instruction) faults and is prevented from retiring.

Interrupts/exceptions/traps and VM exits that occur when state machine 200 is in the WAIT_FOR_CALL state may cause a transition of the state machine to the IDLE state instead of the DELIVER_FAULT state (not shown for ease of illustration in FIG. 2). This is so, as the fault delivered due to the target of the RET is higher priority than any faults caused by the target instruction itself (e.g., #NM, #GP due to various conditions like alignment checks, canonical checks, etc.) or any VM exits caused due to the target instruction being a VM exiting instruction (e.g., exiting on XGETBV, CPUID, etc.). This operation ensures that these asynchronous events do not cause unintended exceptions. Since these events are asynchronous to normal program execution, an attacker cannot realistically force them to be delivered after the RET, and thus they are not an effective way for an attacker to bypass the ROP security. Upon such a state machine transition due to an interrupt/exception/trap or VM exit, the old state (e.g., WAIT_FOR_CALL) of state machine 200 may be saved in a register to allow the exception handler to put state machine 200 back into the appropriate wait state before resuming execution of the interrupted program. In an embodiment, WAIT_FOR_CALL state 220 may be saved if the interrupt/exception/trap results in a change to a processor privilege level, and restored upon a return to the interrupted process. In an embodiment, WAIT_FOR_CALL state 220 associated with a first context or process may be saved by an operating system scheduler in connection with a context/process switch to a second context/process and/or other change to a processor privilege level, and restored in connection with a return to the first context/process.

Thus, a malicious execution of a gadget as illustrated in Table 1, as an example, may be prevented by an embodiment of the present invention, as illustrated in Table 2, as an example.

TABLE 1

| | | |
|---|---|---|
| 0x10: | Instruction; | |
| 0x12: | Instruction; | |
| 0x15: | CALL addr; | → address 0x1a is pushed onto stack and execution switches to called procedure |
| 0x1a: | Instruction; | (intended entry point for non-malicious code) |
| 0x1d: | Instruction; | |
| 0x30: | Instruction; | |
| 0x35: | Instruction; | |
| 0x39: | Instruction; | ← entry point for malicious code (address 0x39 fed via exploited stack) |
| 0x3d: | Instruction; | |
| 0x40: | RET; | |

TABLE 2

| | | |
|---|---|---|
| 0x10: | Instruction; | |
| 0x12: | Instruction; | |
| 0x15: | CALL addr; | → address 0x15 is pushed onto stack and execution switches to called procedure ← RET to CALL |
| 0x1a: | Instruction; | |
| 0x1d: | Instruction; | |
| 0x30: | Instruction; | |
| 0x35: | Instruction; | |
| 0x39: | Instruction; | (RET to malicious code is blocked) |
| 0x3d: | Instruction; | |
| 0x40: | RET; | |

Table 3 summarizes the behavior of a processor executing RET and CALL instructions according to an embodiment of the present invention, with reference to Table 2 as an example. In Table 3, the first column shows whether RET_TO_CALL mode is enabled, the second column shows whether a WAIT_FOR_CALL processor state element is armed (e.g., as described above regarding state 220 of state machine 200), the third column shows the behavior of the processor executing a RET instruction, and the fourth column shows the behavior of the processor executing a CALL instruction.

TABLE 3

| RET_TO_CALL mode | WAIT_FOR_CALL state | CALL | RET |
|---|---|---|---|
| Enabled | Armed | CALL is executed as a NOP and the WAIT_FOR_CALL state is disarmed | RET (or any instruction other than CALL) causes a control flow violation |
| Disabled | Disarmed | Legacy Behavior | Legacy Behavior |
| Enabled | Disarmed | Address of CALL instruction is pushed onto stack (instead of the address of the instruction immediately following the CALL, e.g., 0x15 instead of 0x1a), therefore a subsequent RET will pop the address of the CALL off the stack and re-enter the code at the CALL instruction | RET causes the state machine to arm the WAIT_FOR_CALL state, thus (re)arming the logic that is disarmed only if a CALL instruction is executed; RET also pops the address of the next instruction off the stack (which will result in a control flow violation if it is not a CALL) |
| Disabled | Armed | State Not Possible | State Not Possible |

Figure 3:
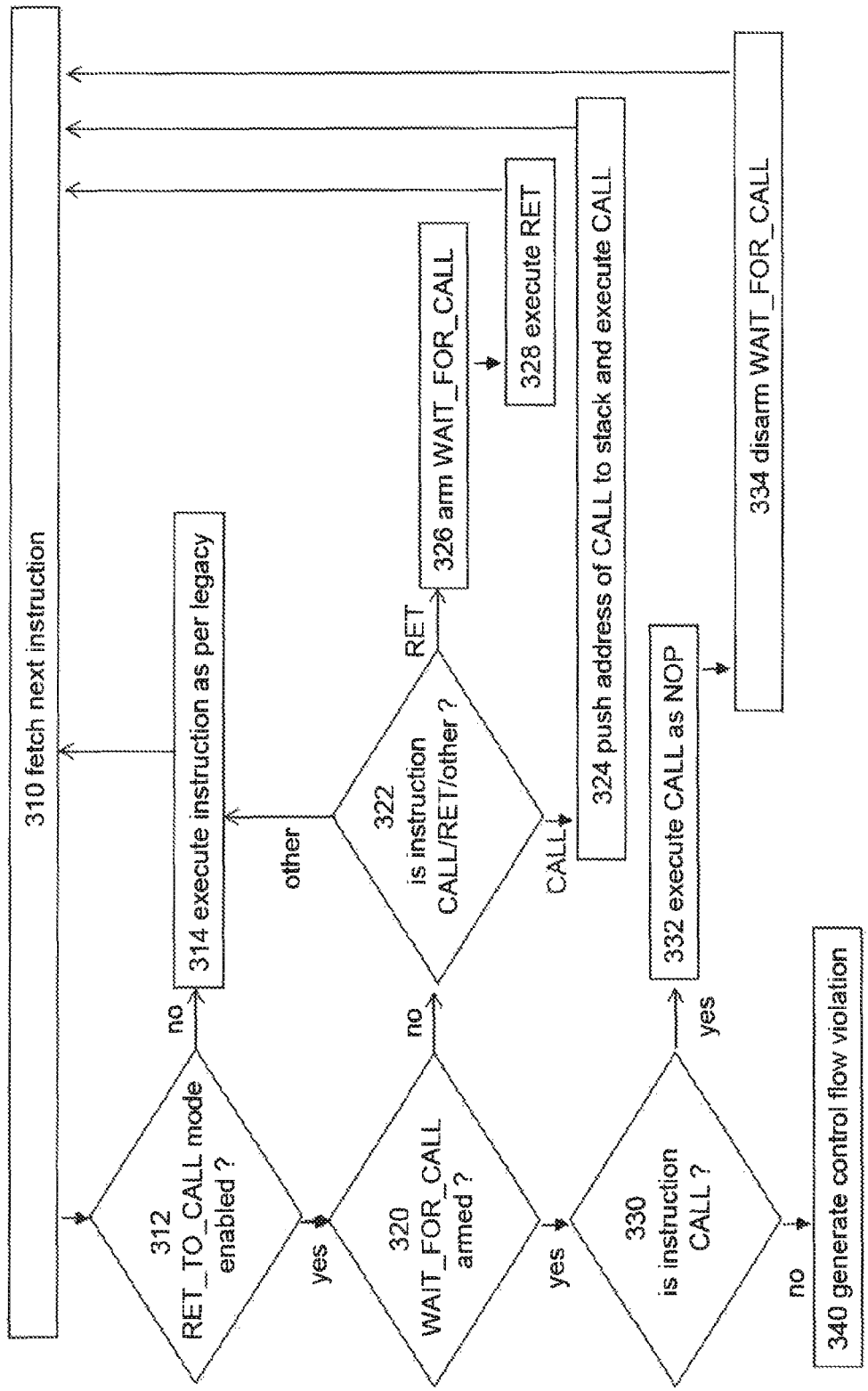
FIG. 3 is a flow diagram of a method in accordance with an embodiment of the present invention.

Referring now to FIG. 3, shown is a flow diagram of a method in accordance with an embodiment of the present invention. As shown, method 300 may be performed by processor front end hardware and/or logic including a CTI state machine as described herein. Note that operations shown in FIG. 3 may relate to state machine operations for control transfer-related instructions. For other instructions, if the state machine is currently in the idle state, it remains there.

Method 300 begins in box 310 by fetching a next instruction for a process being executed by a processor. In box 312, it is determined whether RET_TO_CALL mode is enabled for the current process. If so, method 300 continues to box 320. If not, method 300 continues to box 314, in which the instruction is executed according to any previously known approach, and then back to box 310.

In box 320, it is determined whether the processor is in the WAIT_FOR_CALL state. If so, method 300 continues to box 330. If not, method 300 continues to box 322, in which it is determined whether the instruction is a CALL, a RET, or another instruction. If the instruction is not a CALL or a RET, method 300 continues to box 314. If the instruction is a CALL, method 300 continues to box 324, in which the address of the CALL instruction is pushed to the stack and the CALL is executed, and then back to box 310. If the instruction is a RET, method 300 continues to box 326, in which the processor is put into the WAIT_FOR_CALL state, then to box 328, in which the RET is executed according to any previously known approach (including popping an address from the stack and transferring control to that address), and then back to box 310.

In box 330, it is determined whether the instruction is a CALL. If so, method 300 continues in box 340. If not, method 300 continues in box 332, in which a control flow violation is generated.

In box 340, the CALL is executed as a NOP. In box 342, the WAIT_FOR_CALL state is disarmed.

Figure 4:
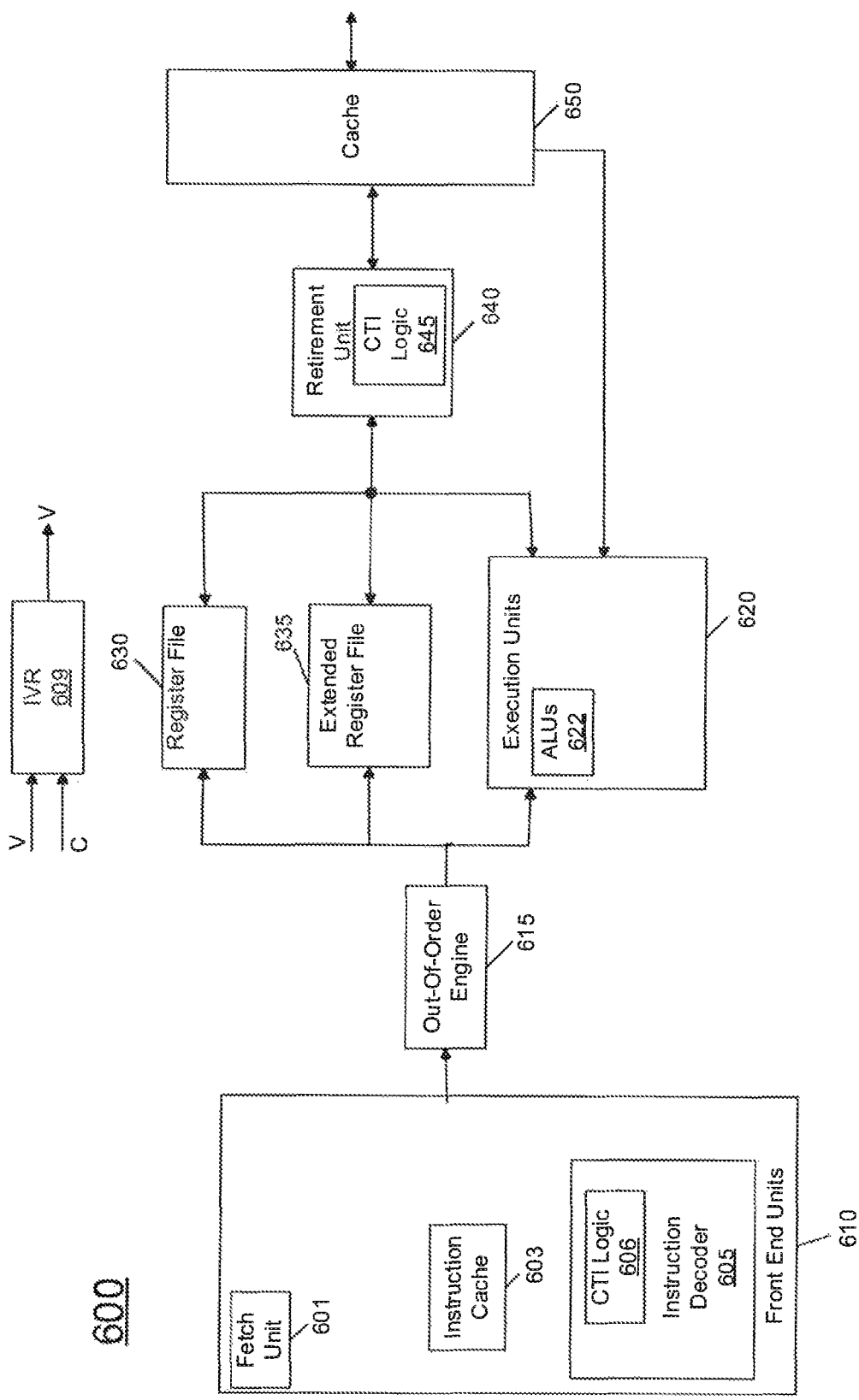
FIG. 4 is a block diagram of a processor core in accordance with one embodiment of the present invention.

Referring now to FIG. 4, shown is a block diagram of a processor core in accordance with one embodiment of the present invention. As shown in FIG. 4, processor core 600 may be a multi-stage pipelined out-of-order processor. Core 600 may support one or more instructions sets (e.g., the x86 instruction set with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.). It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

A processor including core 600 may be a general-purpose processor, such as a Core™ i3, i5, i7, 2 Duo and Quad, Xeon™, Itanium™, XScale™ or StrongARM™ processor, which are available from Intel Corporation. Alternatively, the processor may be from another company, such as a design from ARM Holdings, Ltd, MIPS, etc. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies, such as, for example, BiCMOS, CMOS, or NMOS.

As shown in FIG. 4, core 600 may operate at various voltages and frequencies as a result of integrated voltage regulator 609. As seen in FIG. 4, core 600 includes front end units 610, which may be used to fetch instructions to be executed and prepare them for use later in the processor. For example, front end units 610 may include a fetch unit 601, an instruction cache 603, and an instruction decoder 605. Instruction decoder 605 includes CTI logic 606 in accordance with an embodiment of the present invention, with an associated CTI state machine to perform CTI operations as described herein. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622, among other such execution units.

Results from the execution units may be provided to a retirement unit 640 including a reorder buffer (ROB). This ROB may include various arrays and logic to receive information associated with instructions that are executed. This information is then examined by retirement unit 640 to determine whether the instructions can be validly retired and result data committed to the architectural state of the processor, or whether one or more exceptions occurred that prevent a proper retirement of the instructions. Of course, retirement unit 640 may handle other operations associated with retirement. For retirement operations here, CTI logic 645 of the retirement unit may store CTI state machine state received with incoming instructions, and feed back this information responsive to a misprediction.

As shown in FIG. 4, retirement unit 640 is coupled to a cache 650 which in one embodiment may be a low level cache (e.g., an L1 cache), although the scope of the present invention is not limited in this regard. Also, execution units 620 can be directly coupled to cache 650. From cache 650, data communication may occur with higher level caches, system memory and so forth. While shown with this high level in the embodiment of FIG. 4, understand the scope of the present invention is not limited in this regard. For example, while the implementation of FIG. 4 is with regard to an out-of-order machine such as of an ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 5:
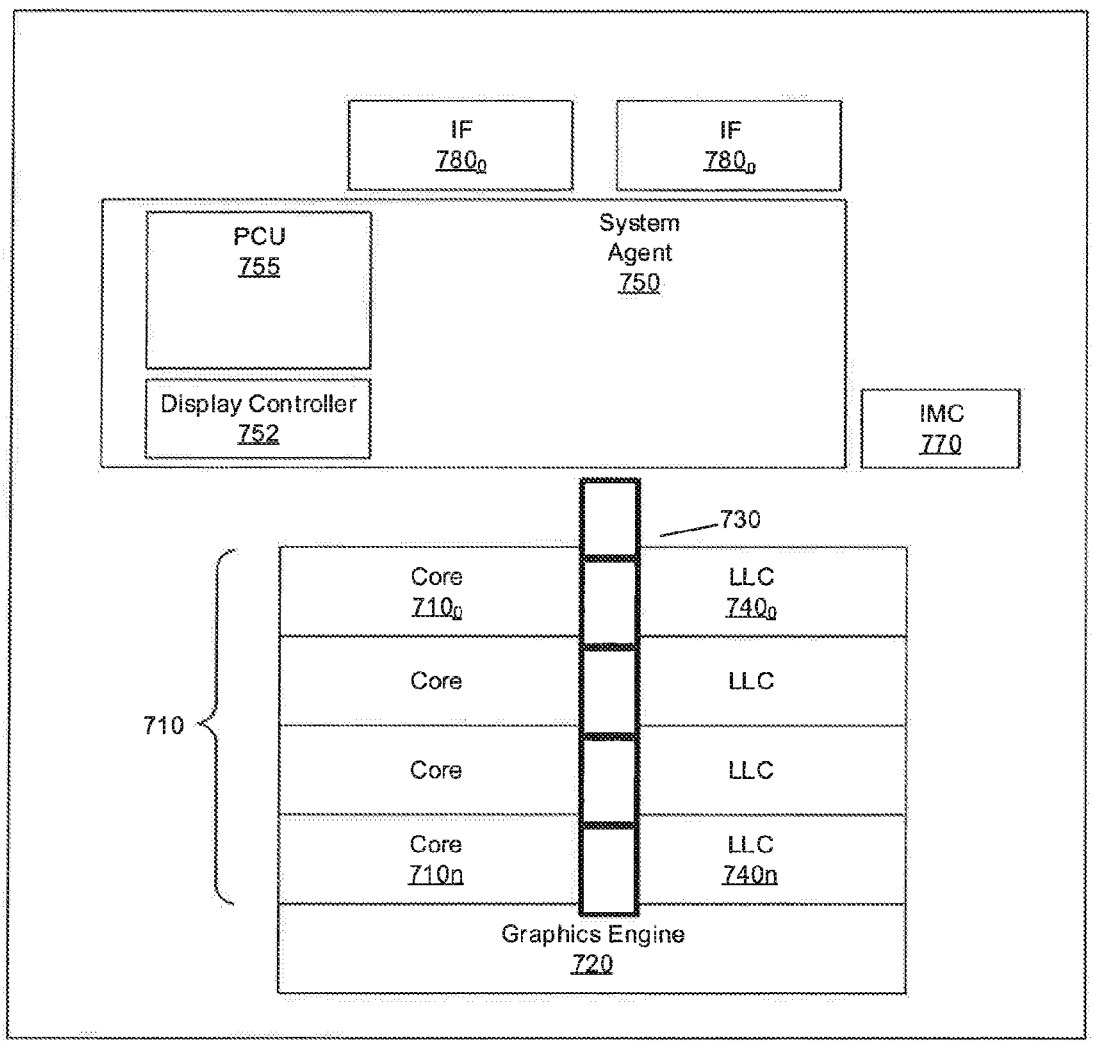
FIG. 5 is a block diagram of a multicore processor in accordance with an embodiment of the present invention.

Referring now to FIG. 5, shown is a block diagram of a multicore processor in accordance with an embodiment of the present invention. As shown in the embodiment of FIG. 5, processor 700 includes multiple domains. Specifically, a core domain 710 can include a plurality of cores $710_0$-$710_n$, a graphics domain 720 can include one or more graphics engines, and a system agent domain 750 may further be present. In various embodiments, system agent domain 750 may handle power control events and power management such that individual units of domains 710 and 720 such as cores and/or graphics engines can be controlled to independently dynamically operate at an appropriate turbo mode frequency in light of the activity (or inactivity) occurring in the given unit. Each of domains 710 and 720 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core 710 may further include low level caches in addition to various execution units and additional processing elements, including CTI logic as described herein. In turn, the various cores may be coupled to each other and to a shared cache memory formed of a plurality of units of a last level cache (LLC) $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750. In one embodiment, interconnect 730 can be part of the core domain. However, in other embodiments, the ring interconnect can be of its own domain.

As further seen, system agent domain 750 may include display controller 752 which may provide control of and an interface to an associated display. As further seen, system agent domain 750 may include a power control unit 755.

As further seen in FIG. 5, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 5, understand the scope of the present invention is not limited in this regard.

Figure 6:
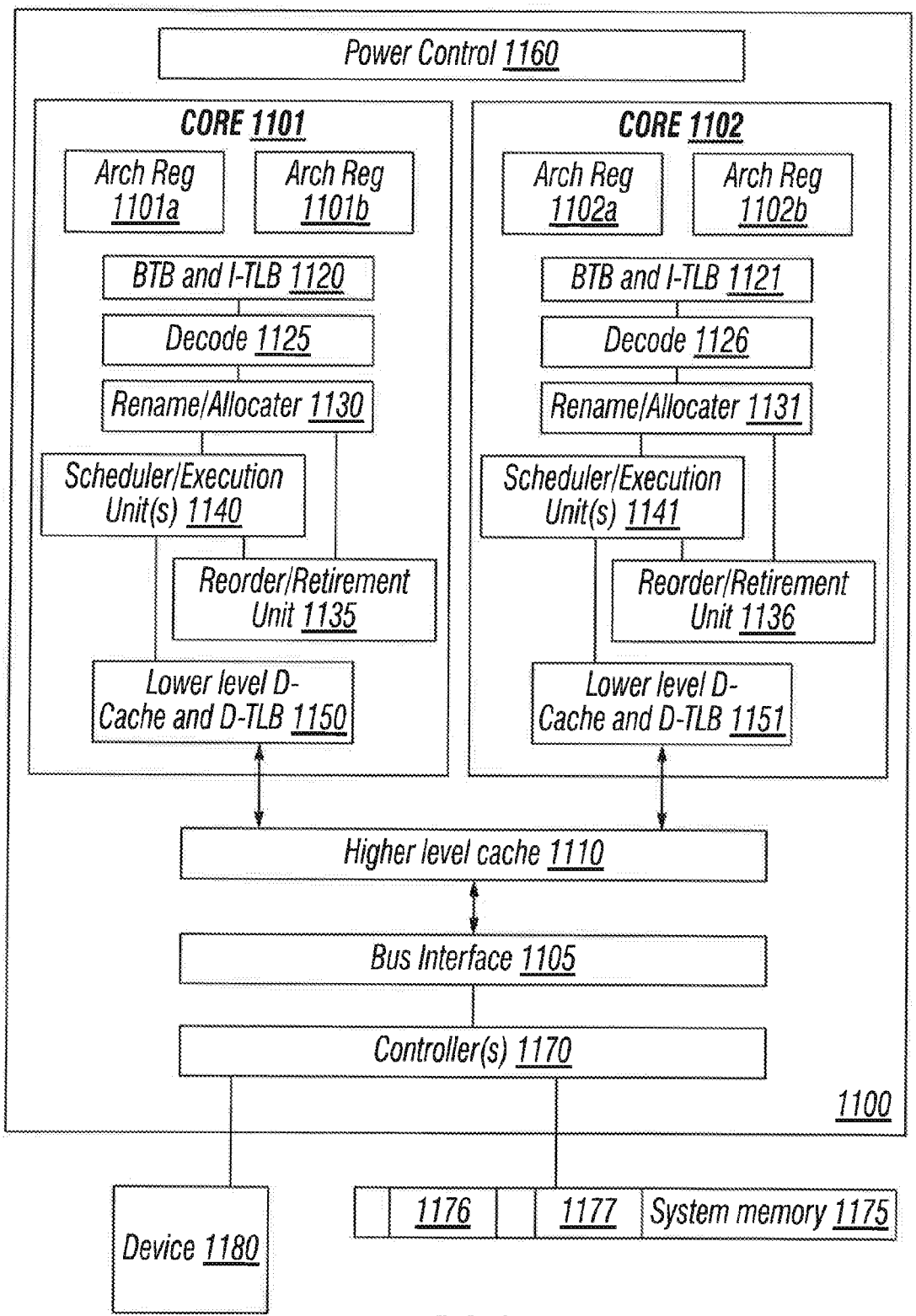
FIG. 6 is an embodiment of a processor including multiple cores in accordance with an embodiment of the present invention.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native ISA including CT instructions as described herein, a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions including CT instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
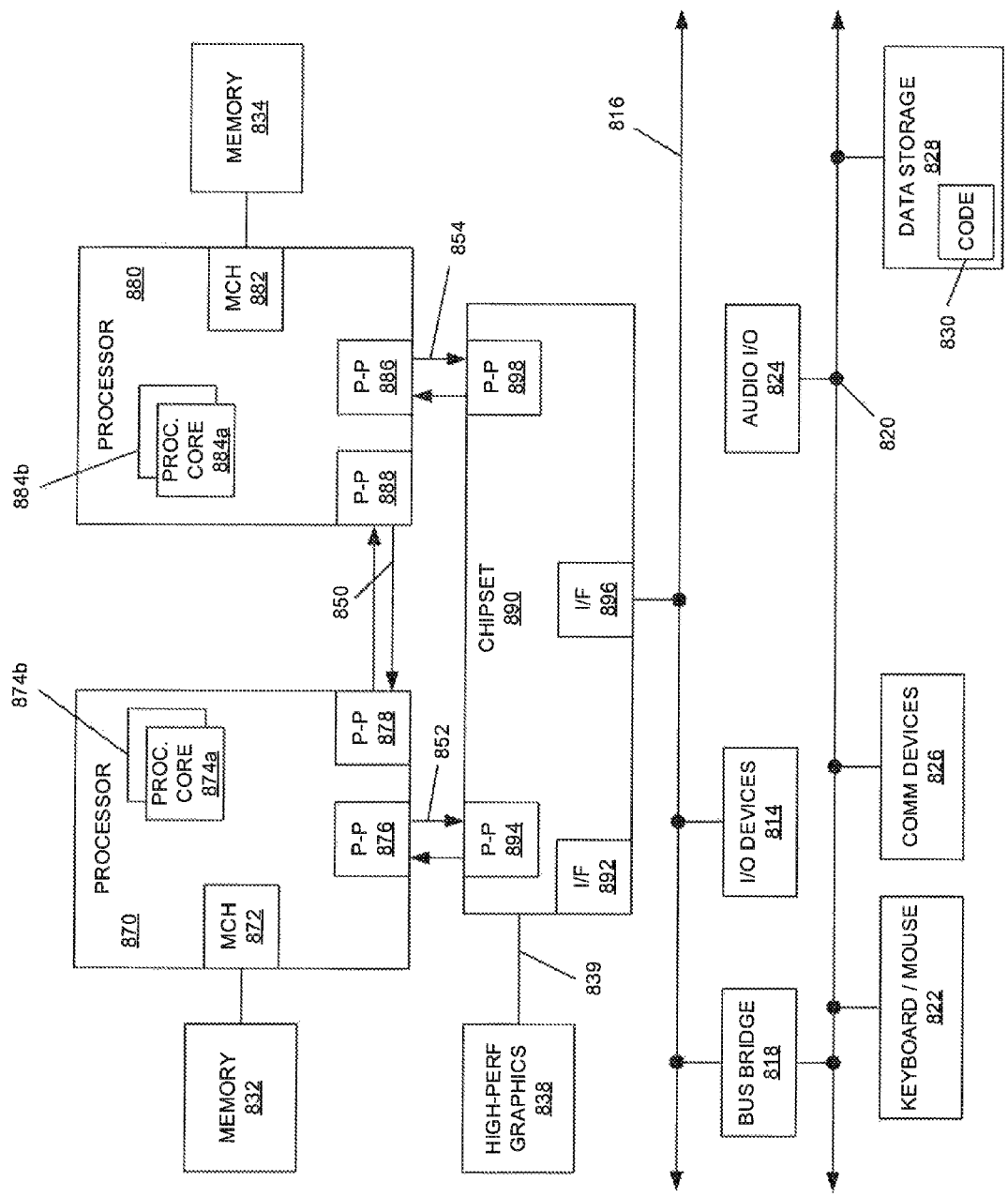
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 800 is a point-to-point interconnect system, and includes a first processor 870 and a second processor 880 coupled via a point-to-point interconnect 850. As shown in FIG. 7, each of processors 870 and 880 may be multicore processors, including first and second processor cores (i.e., processor cores 874a and 874b and processor cores 884a and 884b), although potentially many more cores may be present in the processors. Each of the processors can include CTI-based logic to defend against ROP and other security attacks using CT instructions including user level and supervisor level instructions.

Still referring to FIG. 7, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 7, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 7, chipset 890 includes P-P interfaces 894 and 898.

Furthermore, chipset 890 includes an interface 892 to couple chipset 890 with a high performance graphics engine 838 by a P-P interconnect 839. In turn, chipset 890 may be coupled to a first bus 816 via an interface 896. As shown in FIG. 7, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, Ultrabook™, or so forth.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor to operate in a first mode and a second mode, comprising:
   front-end hardware including:
   a decoder to decode a plurality of control transfer instructions, the plurality of control transfer instructions including a call instruction and a return instruction; and
   a state machine to raise a fault in the first mode if a next instruction to be executed immediately after the return instruction is not the call instruction;
   wherein, in the first mode, execution of the call instruction is to include pushing on a stack an address of the call instruction, and
   wherein, in the second mode, execution of the call instruction is to include pushing on the stack an address of an instruction immediately following the call instruction.

2. The processor of claim 1, wherein, in the first mode, execution of the return instruction includes arming a state of the state machine to cause a next instruction to be executed immediately after the return instruction to be executed as a no-operation instruction if it is the call instruction.

3. The processor of claim 2, wherein, in the first mode, the state is disarmed in response to popping the call instruction from the stack by execution of the return instruction when the state is armed.

4. The processor of claim 2, wherein the state is saved in connection with a context switch.

5. The processor of claim 2, wherein the state is saved in connection with a change to a processor privilege level.

6. A method comprising:
   decoding, by a processor, a call instruction;
   executing, if the processor is in a first mode, the call instruction, including pushing on a stack an address of the call instruction;
   executing, if the processor is in a second mode, the call instruction, including pushing on the stack an address of an instruction immediately following the call instruction;
   decoding, by the processor, a return instruction;
   determining, by the processor in the first mode, whether a next instruction immediately after the return instruction is not a call instruction; and raising a fault in response to determining, in the first mode, that the next instruction is not a call instruction.

7. The method of claim 6, further comprising executing, in the first mode, the return instruction, including arming a state to cause a next instruction to be executed immediately after the return instruction to be executed as a no-operation instruction if it is the call instruction.

8. The method of claim 7, further comprising, in the first mode, disarming the state in response to popping the call instruction from the stack by execution of the return instruction when the state is armed.

9. The method of claim 7, further comprising saving the state in connection with a context switch.

10. The method of claim 7, further comprising saving the state in connection with a change to a processor privilege level.

11. The method of claim 7, further comprising matching, by software running on the processor, the return instruction to the call instruction.

12. A system comprising:
   a memory including a sequence of instructions to be executed by a processor, the sequence of instructions including a call instruction and a return instruction; and
   the processor, including
   a decode unit to decode the sequence of instructions, and
   an execution unit to execute the sequence of instructions;
   wherein the processor is to operate in a first mode in which execution of the call instruction is to include pushing on a stack a memory address of the call instruction and in which the processor is to raise a fault if a next instruction to be executed immediately after the return instruction is not the call instruction; and
   wherein the processor is also to operate in a second mode in which execution of the call instruction is to include pushing on the stack a memory address of an instruction immediately following the call instruction.

13. The system of claim 12, wherein, in the first mode, execution of the return instruction includes arming a state to cause a next instruction to be executed immediately after the return instruction to be executed as a no-operation instruction if it is the call instruction.

14. The system of claim 13, wherein, in the first mode, the state is disarmed in response to popping the call instruction from the stack by execution of the return instruction when the state is armed.

\* \* \* \* \*